United States Patent
Mackin et al.

(10) Patent No.: US 11,078,841 B2
(45) Date of Patent: Aug. 3, 2021

(54) BLEED AIR SYSTEMS FOR USE WITH AIRCRAFT AND RELATED METHODS

(71) Applicant: The Boeing Company, Chicago, IL (US)

(72) Inventors: Steve G. Mackin, Bellevue, WA (US); Hosam E. El-Gabalawy, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 595 days.

(21) Appl. No.: 15/948,015

(22) Filed: Apr. 9, 2018

(65) Prior Publication Data

US 2019/0309683 A1 Oct. 10, 2019

(51) Int. Cl.
| | | |
|---|---|---|
| F02C 7/047 | (2006.01) | |
| F02C 7/143 | (2006.01) | |
| B64D 13/06 | (2006.01) | |
| F02C 9/18 | (2006.01) | |
| F02C 3/13 | (2006.01) | |

(52) U.S. Cl.
CPC .............. *F02C 7/047* (2013.01); *B64D 13/06* (2013.01); *F02C 3/13* (2013.01); *F02C 7/143* (2013.01); *F02C 9/18* (2013.01); *B64D 2013/0618* (2013.01); *F05D 2220/3218* (2013.01); *F05D 2220/3219* (2013.01); *F05D 2270/301* (2013.01); *F05D 2270/303* (2013.01); *F05D 2270/312* (2013.01); *F05D 2270/313* (2013.01)

(58) Field of Classification Search
CPC .. F02C 7/047; F02C 7/143; F02C 9/18; F02C 3/13; F02C 6/08; B64D 13/06; B64D 2013/0618; B64D 33/02; B64D 15/04; B64D 2033/0233; F05D 2270/312; F05D 2220/3218; F05D 2220/3219; F05D 2270/301; F05D 2270/303; F05D 2270/313; F05D 2260/60
See application file for complete search history.

(56) References Cited

U.S. PATENT DOCUMENTS

| | | | |
|---|---|---|---|
| 8,955,794 B2 | 2/2015 | Mackin et al. | |
| 8,967,528 B2 | 3/2015 | Mackin et al. | |
| 10,457,401 B2* | 10/2019 | Feulner | B64F 1/34 |
| 2010/0107594 A1* | 5/2010 | Coffinberry | F02C 9/18 |
| | | | 60/39.093 |
| 2013/0187007 A1* | 7/2013 | Mackin | F02C 6/04 |
| | | | 244/134 R |
| 2014/0260295 A1* | 9/2014 | Ullyott | F02C 3/113 |
| | | | 60/774 |
| 2015/0121842 A1* | 5/2015 | Moes | F02K 3/075 |
| | | | 60/204 |

(Continued)

*Primary Examiner* — Assres H Woldemaryam
(74) *Attorney, Agent, or Firm* — Hanley, Flight & Zimmerman, LLC

(57) ABSTRACT

Bleed air systems for use with aircraft and related methods are disclosed. An example apparatus includes a compressor having a compressor inlet and a compressor outlet. The compressor inlet to receive airflow from a first air supply source. An air mixing device having a first mixer inlet to receive compressed air from the compressor outlet and a second mixer inlet to receive bleed air from a bleed air system. The bleed air to provide a motive fluid to enable the air mixing device to mix the bleed air and the compressed air to produce mixed air for the anti-icing system.

20 Claims, 8 Drawing Sheets

(56) References Cited

U.S. PATENT DOCUMENTS

| | | | |
|---|---|---|---|
| 2015/0275758 A1* | 10/2015 | Foutch | F02C 7/32 60/779 |
| 2015/0275769 A1* | 10/2015 | Foutch | F02C 7/27 60/776 |
| 2017/0233081 A1* | 8/2017 | Sautron | B64D 13/06 60/783 |
| 2017/0268431 A1* | 9/2017 | Schwarz | F02C 3/04 |
| 2017/0363098 A1* | 12/2017 | Taylor | F04D 29/321 |
| 2018/0009536 A1* | 1/2018 | Christopherson | F02C 3/04 |
| 2018/0057170 A1* | 3/2018 | Sautron | F02C 6/08 |

* cited by examiner

BLEED AIR SYSTEMS FOR USE WITH AIRCRAFT AND RELATED METHODS

FIELD OF DISCLOSURE

The present disclosure relates generally to aircraft and, more particularly, to bleed air systems for use with aircraft and related methods.

BACKGROUND

Commercial aircraft typically employ bleed air systems to provide heated air for anti-icing applications. Air supply to these systems is typically provided by bleed air extracted from a compressor of an aircraft engine. To meet pressure and/or temperature demands of a thermal anti-icing system, bleed air is often extracted from a higher stage of the compressor that provides bleed air having a relatively high temperature and/or pressure.

SUMMARY

An example aircraft anti-icing system includes an air mixer (e.g., a pneumatic jet pump, an eductor, an ejector, etc.) that is configured to mix compressed air derived from an external engine driven compressor and bleed air to generate anti-icing air. As the bleed air (warmer air) will be a substantially variable in pressure and temperature during different phases of flight, the external engine driven compressor air (cooler air) can be regulated to either increase or decrease the pressure and temperature of the anti-icing air as needed without the need to advance engine throttle or increase engine idle during icing conditions (e.g., thereby improving specific fuel consumption (SFC), engine operability and airplane descent performance).

An example apparatus includes a compressor having a compressor inlet and a compressor outlet. The compressor inlet to receive airflow from a first air supply source. An air mixing device having a first mixer inlet to receive compressed air from the compressor outlet and a second mixer inlet to receive bleed air from a bleed air system. The bleed air to provide a motive fluid to enable the air mixing device to mix the bleed air and the compressed air to produce mixed air for the anti-icing system.

An example apparatus includes a compressor to compress airflow received from a fan bypass duct. An air mixer has a first mixer inlet to receive compressed air from the compressor and a second mixer inlet to receive bleed air from a bleed air port. The air mixer is to use the bleed air as motive fluid to mix the compressed air and the bleed air to produce mixed air at a discharge of the air mixer for the anti-icing system. A controller to regulate a pressure of the compressed air at the first mixer inlet and a pressure of the bleed air at the second mixer inlet to produce the mixed air with a discharge pressure that is within a mixed air pressure threshold.

An example method includes receiving a flight condition; determining a heat flux of a mixed air to be discharged by an mixer based on the flight condition; obtaining a reference pressure corresponding to the heat flux; and operating at least one of a first control valve to regulate a pressure of compressed air flowing to a first mixer inlet of an air mixer or a second control valve to regulate a pressure of bleed air flowing to a second mixer inlet of the air mixer to produce the mixed air having a discharge pressure at a discharge of the air mixer that is within a mixed air pressure threshold of the reference pressure.

Certain examples are shown in the above-identified figures and described in detail below. The features, functions and advantages that have been discussed can be achieved independently in various embodiments or can be combined in yet other embodiments further details of which can be seen with reference to the following description and drawings. The figures are not necessarily to scale and certain features and certain views of the figures may be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts.

Figure 1:
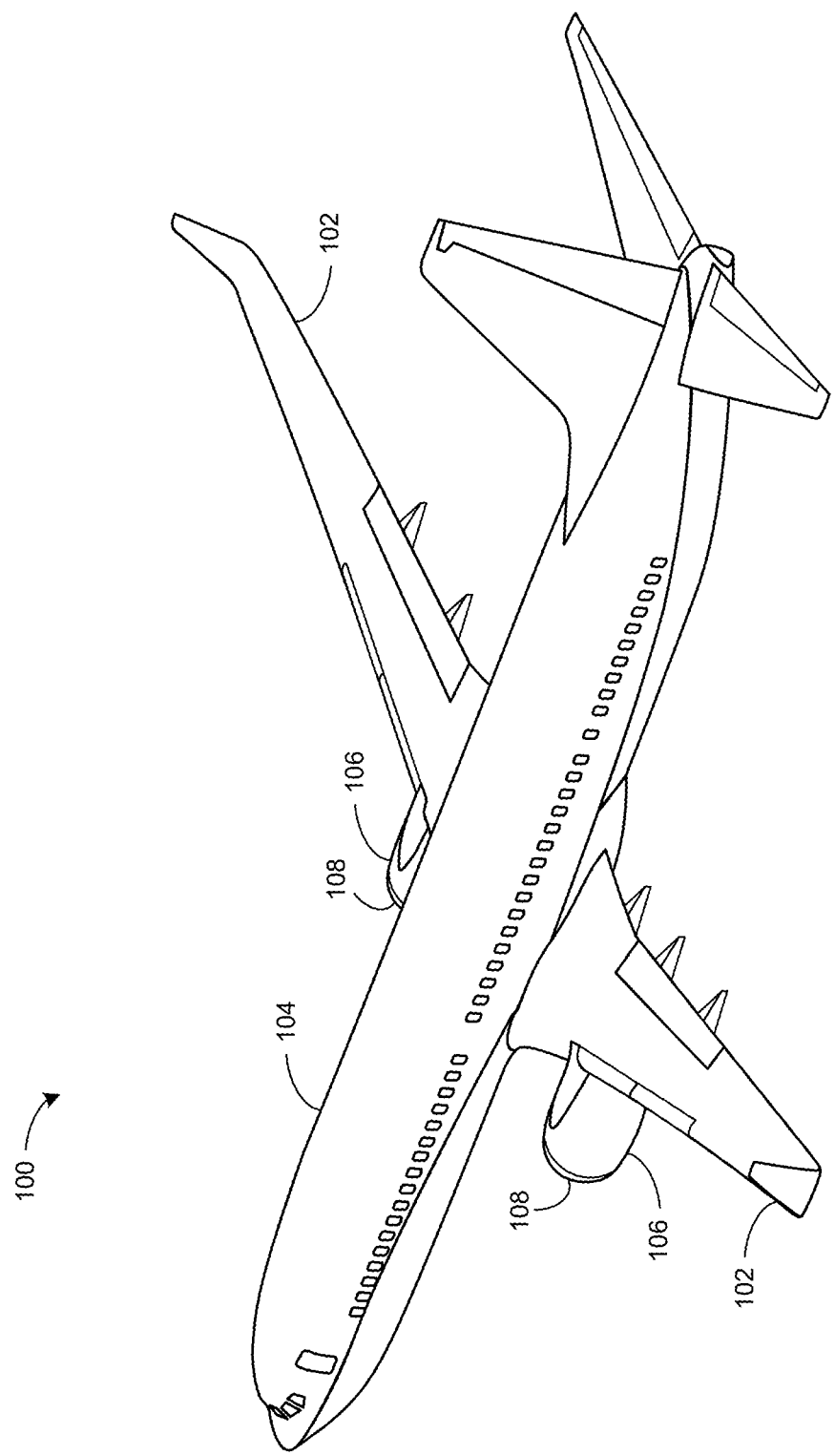
FIG. 1 is an illustration of an example aircraft having an aircraft engine implemented with an example bleed air system in accordance with teachings of this disclosure.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Aircraft typically employ thermal anti-icing systems during certain phases of flight. For example, thermal anti-icing systems are employed during taxiing, takeoff, climb, descent and landing. Typically, thermal anti-icing systems are activated when the aircraft experiences icing conditions (e.g., Liquid Water Content LWC is present) below a threshold altitude (e.g., below 30,000 feet from sea level) and the air temperature is below a threshold temperature (e.g., 50 degrees Fahrenheit). Thus, in some cases, aircraft employ thermal anti-icing systems when holding at altitudes below 30,000 feet and air temperature (e.g., total air temperature) is less than 50° F. In some examples, aircraft include ice detectors that detect ice formation. Such detectors may be employed to activate thermal anti-icing systems. In some examples, a flight crew may activate the thermal anti-icing systems.

To power thermal anti-icing systems of aircraft, anti-icing systems employ engine bleed air provided by a compressor of an aircraft engine (e.g., a lower pressure compressor or high-pressure compressor positioned in a core of the engine). The bleed air is often bled from a compressor of the aircraft engine via a dedicated bleed port in a housing of the compressor. However, bleed air temperatures and pressures vary greatly with operating conditions such as, for example, engine speed, operating altitude, environmental conditions (e.g., air temperature, humidity, etc.) and/or during the different phases of flight. Much of the energy consumed by the engine to produce the bleed air can be wasted if not used, thereby increasing fuel burn and reducing engine efficiency, or not adequately at the correct operating pressure or hot enough Thus requiring engine icing idle increase.

In some instances, bleed air extracted from a dedicated bleed port provides insufficient heat and/or pressure to implement an anti-icing system of an aircraft. For example, bleed air used to implement thermal anti-icing systems of aircraft can have a temperature and/or pressure that is either lower or greater than a temperature threshold or a pressure threshold. For example, when an aircraft is taxiing or idle, a temperature and/or pressure of the bleed air can be insufficient to implement an anti-icing system. For example, if a temperature of the bleed air is less than a temperature threshold, the anti-icing system is ineffective at removing ice from aircraft structure. If a pressure of the bleed air is less than a pressure threshold, an engine anti-icing valve in fluid communication with to the bleed port remains closed (e.g., cannot open) to allow bleed air flow to the anti-icing system.

As a result, a crew of the aircraft receives a warning indication (e.g., a return to gate warning indication) that the anti-icing system is not functioning properly, prompting the crew to return to a gate of an airport to report and inspect the anti-icing system. Often, engine idle/throttle needs to be advanced to enable adequate performance of an anti-icing system and remove the return to gate warning indication. However, advancing engine idle/throttle during taxiing increases thrust output. To prevent the aircraft from increasing speeds while taxiing or moving when idle as a result of the increased thrust, a braking system of the aircraft is employed. However, employing the braking system increases brake wear, thereby increasing maintenance. Additionally, advancing thrust burns a larger volume of fuel, thereby reducing aircraft efficiency.

Bleed air extracted from the engine can exceed the temperature threshold of the anti-icing system. To reduce the temperature of the bleed air, the bleed air is cooled prior to supplying the bleed air to the anti-icing system. To reduce the bleed air temperature, commercial aircraft typically employ a heat exchanger (e.g., a precooler) through which bleed air passes and which is typically located on a pylon adjacent to the engine. A fan operated by the engine of the aircraft provides cool air to the precooler to cool the bleed air prior to supplying the bleed air to the systems of the aircraft. The fan air often is dumped overboard after flowing through the precooler. Additionally, the precooler typically has a relatively large dimensional envelope, which adds extra weight and needs a fan air scoop and exhaust that produce drag. Thus, the relatively large dimensional envelope of the precooler can also affect the efficiency of the aircraft engine. As a result, a substantial amount of the energy spent by the engine to produce the bleed air is wasted when cooling the bleed air, which results in greater fuel consumption.

In some instances, bleed air having excessive heat (e.g., significantly greater than an anti-icing temperature threshold) can degrade structures of the aircraft. To prevent degradation to certain structures (e.g., an engine inlet lip), the structures are composed of material(s) (e.g., titanium) that can withstand the elevated temperatures. However, such material(s) are expensive and increase aircraft weight, thereby increasing manufacturing costs and decreasing aircraft efficiency. Anti-icing air having a temperature greater than the temperature threshold can cause discoloration and/or delamination to exhaust louvers of the aircraft, thereby increasing maintenance costs. In some instances, bleed air extracted from the engine often exceeds an anti-icing air pressure threshold. In these instances, the pressure of the bleed air is reduced prior to supplying the bleed air to the anti-icing system. To reduce the bleed air pressure, commercial aircraft typically employ one or more pressure regulating valves through which bleed air passes. Thus, a substantial amount of the energy spent by the engine to produce the bleed air is wasted when reducing the pressure of the bleed air. This wasted energy results in greater fuel consumption.

In some known systems (e.g., for relatively small aircraft), heat for anti-icing systems is provided via electrically powered heating elements or generators. However, a weight or size of an electric generator capable of producing sufficient heat for an anti-icing system is unacceptable for larger aircraft (e.g., commercial aircraft). In other known examples, a bleed air system employs a turbo-compressor or shaft-driven compressor that receives ambient air from an atmospheric inlet. However, the atmospheric inlet produces drag. Additionally, the atmospheric inlet is often susceptible to icing and, thus, needs an anti-icing system that increases costs and system complexity. Further, the turbo-compressor or shaft-driven compressor may have to be relatively large to produce a pressure change sufficient to power the systems of an aircraft.

Example anti-icing systems and related methods disclosed herein combine (e.g., mix) compressed air (e.g., compressed fan air) and bleed air to provide mixed air (e.g., anti-icing air) to aircraft systems (e.g., environmental control systems, thermal anti-icing systems, etc.). For example, a bleed air system disclosed herein provides anti-icing air for thermal anti-icing systems (e.g., a wing and/or engine anti-icing system) by combining (e.g., mixing) jet engine bleed air and compressed air (e.g., a cabin supply air). Specifically, the bleed air is employed to increase a temperature of the compressed air. Augmenting bleed air with compressed air reduces engine bleed air extraction. Additionally, employing compressed air to augment the bleed air provides anti-icing air during anti-icing operations with sufficient pressure and temperature (e.g., satisfying respective pressure and temperature thresholds) without the need to increase engine thrust (e.g., throttle the aircraft engine) when the aircraft is taxiing or idling, which significantly reduces warning events (e.g., return to gate warnings) and reduces braking that would otherwise be needed as a result of increased engine thrust. Such utilization of bleed air to increase a temperature of the cabin supply air significantly reduces the size or weight of a cabin supply air compressor needed to provide cabin supply air and anti-icing air. For example, a temperature of the mixed air or anti-ice air is regulated by throttling different amounts of cabin supply air and mixing the cabin supply air with the engine bleed air. Additionally, the bleed air systems disclosed herein provide cabin supply air for environmental control systems of aircraft.

A compressor receives airflow from a fan discharge and compresses the airflow to produce compressed air that is mixed with the bleed air to produce the mixed air (e.g., anti-icing air, cabin supply air, etc.). The compressor is external to and separate from a turbofan engine of an aircraft that produces thrust. Thus, in some examples, cabin supply air is not generated from bleed air. The example compressor disclosed herein is a shaft-driven compressor system that compresses or pressurizes fan air to provide compressed or pressurized air to the various systems of an aircraft such as, for example, an environmental control system (ECS), a thermal anti-icing system, a pneumatic supply system (to supply pneumatic devices), and/or any other system of the aircraft that requires use of compressed air. The example shaft-driven compressor systems extract or divert fan air and pressurize the fan air to meet (e.g., but not exceed) the demand(s) of the systems of the aircraft. As a result, less energy is used by the aircraft engine during certain flight conditions. Thus, the example bleed air systems disclosed herein reduce energy waste and improve aircraft engine efficiency, even when taking into account the power used to operate the shaft-driven compressor.

In some examples, the shaft-driven compressor system can be used in combination with a two-port or single-port bleed air system. The two-port or single-port bleed air system can be used to supplement the shaft-driven compressor system and provide compressed air to the various aircraft systems (e.g., the anti-icing system, the ECS, etc.) during certain operating conditions. Additionally, the two-port or single-port bleed air system provides redundancy within the entire example bleed air system of the aircraft. In other words, if the shaft-driven compressor system is inoperable, the two-port or single-port bleed air system is capable of providing bleed air to the systems of the aircraft.

FIG. 1 illustrates an example aircraft 100 that embodies aspect of teachings of this disclosure. The aircraft 100 of the illustrated example includes wings 102 extending from a fuselage 104 that defines a passenger cabin. Each of the wings 102 supports an aircraft engine 106. The aircraft 100 of the illustrated example includes a bleed air system (e.g., the bleed air system 200 of FIG. 2) that provides cabin supply air to an environmental control system that provides cabin air to the passenger cabin of the fuselage 104 and provides anti-icing air to a thermal anti-icing system (e.g., an engine and/or wing anti-icing system) that removes and/or prevents formation of ice on exterior surfaces of an engine lip 108 and/or the wings 102.

Figure 2:
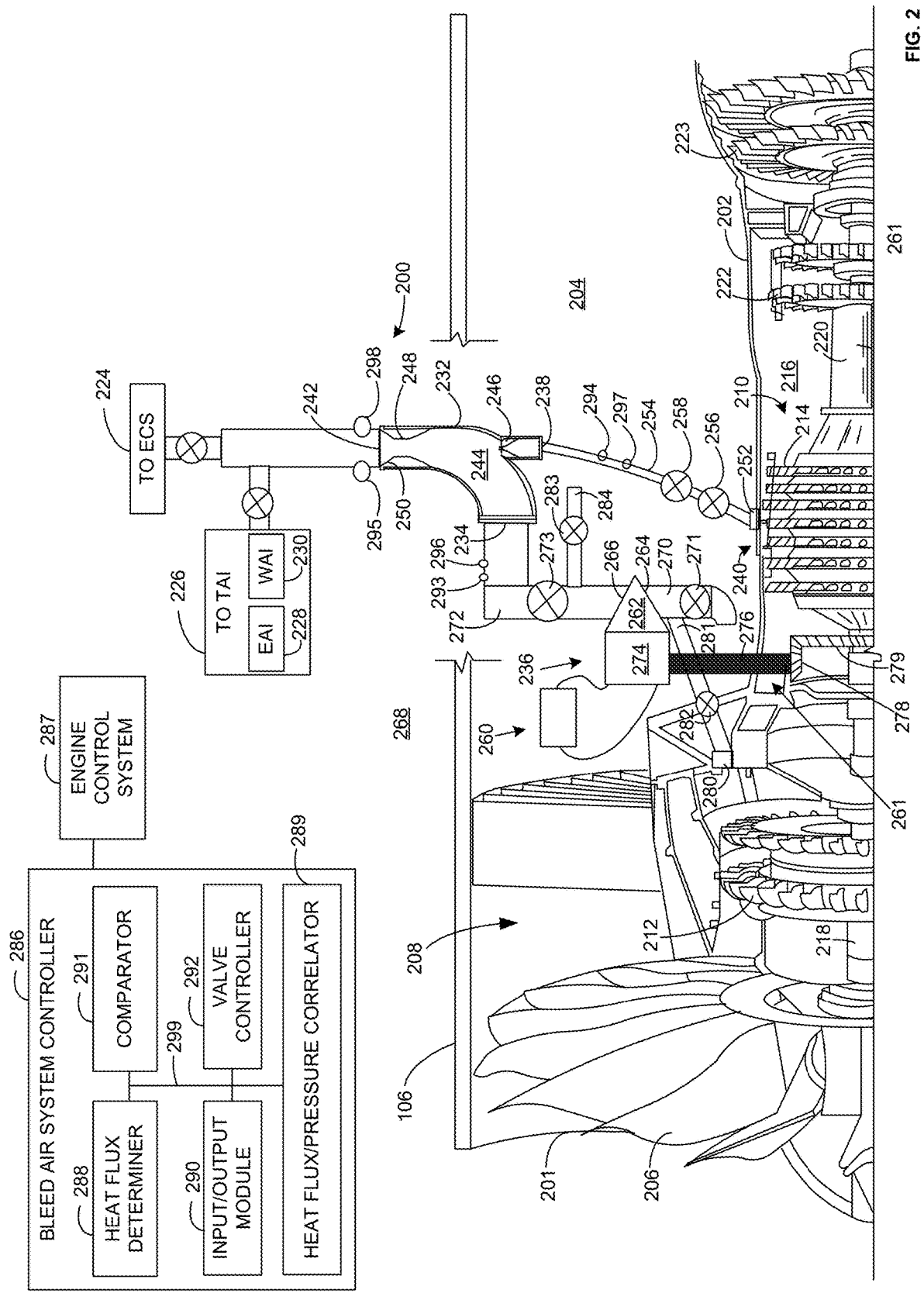
FIG. 2 is a schematic illustration of the example bleed air system of FIG. 1.

FIG. 2 is a partial cutaway view of the aircraft engine 106 of the aircraft 100 of FIG. 1. The example aircraft engine 106 includes an example bleed air system 200 in accordance with the teachings of this disclosure. For brevity, only one aircraft engine 106 is described. However, each aircraft engine 106 of the aircraft 100 of FIG. 1 employs the bleed air system 200. In some examples, only one aircraft engine 106 employs the bleed air system 200.

Referring to FIG. 2, the aircraft engine 106 is a turbofan engine having a core gas turbine engine 202 and a fan 206. In operation, the fan 206 draws air (e.g., atmospheric air) into a fan inlet duct 208. A portion of the air produced by the fan 206 is provided to the core gas turbine engine 202 for combustion and a second portion of air produced by the fan 206 bypasses the core gas turbine engine 202 and is used to produce forward thrust.

The core gas turbine engine 202 includes a compressor 210, that in the illustrated embodiment, is a dual-axial compressor that includes a first or low-pressure compressor (LPC) 212 and a second or high-pressure compressor (HPC) 214. Additionally, each of the LPC 212 and the HPC 214 includes various compressor stages that progressively increase the pressure of the air as the air flows from the engine inlet 201 to a combustion chamber 216 of the core gas turbine engine 202. In the example shown, the LPC 212 provides relatively low-pressure air and the HPC 214 provides relatively high-pressure air. The LPC 212 and the HPC 214 are operatively coupled to a first shaft or LPC shaft 218 and a second shaft or HPC shaft 220, respectively. The LPC shaft 218 is operatively coupled to a low-pressure turbine 223 and the HPC shaft 220 is operatively coupled to a high-pressure turbine 222. In some examples, the compressor 210 includes more or fewer compressor sections, each having, for example, a turbine and respective shaft.

After exiting the HPC 214, the highly pressurized air is provided to the combustion chamber 216, where fuel is injected and mixed with the high-pressure air and ignited. The high energy airflow exiting the combustion chamber 216 turns blades of the turbines 222, 223, which are coupled to respective ones of the LPC shaft 218 and HPC shaft 220. Rotation of the LPC shaft 218 and the HPC shaft 220 turns blades of the LPC 212 and the HPC 214, respectively. The heated air then exhausted from the core gas turbine engine 202.

To supply various systems of an aircraft with pressurized air (i.e., compressed air), the aircraft engine 106 of the illustrated example includes the bleed air system 200. The bleed air system 200 of the illustrated example provides mixed air (e.g., pressurized and/or heated air) to various systems including, for example, an environmental control system (ECS) 224, a thermal ant-icing system (TAI) 226 that includes an engine anti-icing system (EAI) 228 and a wing anti-icing system (WAI) 230 and/or any other system of an aircraft that utilizes pressured and/or heated air. An ECS, for example, conditions cabin supply air to a cabin pressure and/or cabin temperature and supplies the conditioned air to the passenger cabin of the fuselage 104 (FIG. 1). The ECS 224 can include one or more ECS packs (e.g., an air cycle refrigeration system) that receive the mixed air (e.g., pressurized and/or heated air) from the bleed air system 200 and conditions or regulates the air to cabin pressure and/or temperature. The engine anti-icing system 228 and the wing anti-icing system 230 utilize the bleed air to de-ice or prevent ice formation on exterior surfaces of the aircraft engine 106 (e.g., the engine lip 108 of FIG. 1) and the wings 102 of FIG. 1.

To provide the mixed air (e.g., compressed air) to the various systems described above, the bleed air system 200 of the illustrated example combines (e.g., mixes) engine bleed air and compressed air at a location upstream from the various systems (e.g., the ECS 224, the TAI 226, etc.). To combine the bleed air and the compressed air, the bleed air system 200 of the illustrated example includes an air mixing device 232. The air mixing device 232 has a first mixer inlet 234 to receive compressed air (e.g., from a first air supply source 236) and a second mixer inlet 238 to receive bleed air (e.g., from a second air supply source 240). The air mixing device 232 mixes the compressed air and the bleed air to provide mixed air (e.g., anti-icing air) at a discharge 242 (e.g., an air mixing device outlet) of the air mixing device 232 for use by one or more systems (e.g., the ECS 224, the TAI 226) of the aircraft 100. In some examples, the compressed air has a first temperature, the bleed air has a second temperature greater than the first temperature, and the mixed air has a third temperature between the first temperature and the second temperature. In some examples, the air mixing device 232 provides means for mixing compressed air and bleed air.

The air mixing device 232 of the illustrated example is a pneumatic jet pump ejector. In some examples, the air mixing device 232 is an eductor, an ejector and/or any other mixing device. To this end, the air mixing device 232 of the illustrated example includes a passageway 244, a nozzle 246 adjacent the second mixer inlet 238, a throat 248 and a diffuser 250 adjacent the discharge 242. The nozzle 246 of the illustrated example increases a velocity of the bleed air (e.g., a motive fluid) and decreases a pressure of the bleed air as the bleed air flows through the nozzle 246 and into the passageway 244. As a result, a low-pressure region (e.g., a pressure drop) forms in the passageway 244 to cause the compressed air (e.g., a suction air) to flow in the passageway 244 and mix with the bleed air in passageway 244 and/or the throat 248 to provide the mixed air at the discharge 242. Thus, the bleed air provides a motive fluid to enable the air mixing device 232 to mix the bleed air and the compressed air to provide mixed air at the discharge 242 (e.g., and to the TAI 226). The diffuser 250 reduces the velocity of the mixed bleed air and compressed air (e.g., to pipeline velocities), which allows recovery (e.g., an increase) of the pressure of the mixed air as it exits the discharge 242. As described in greater detail below, the mixed air at the discharge 242 of the air mixing device 232 has a predetermined heat flux (e.g., mass flow rate and temperature). The predetermined heat flux is sufficient to meet the demands of the TAI 226 and the ECS 224.

The bleed air of the illustrated example is extracted from the aircraft engine 106. Specifically, the bleed air is provided from a bleed port 252 of the HPC 214. For example, the second mixer inlet 238 receives bleed air from a dedicated compressor stage of the HPC 214 (e.g., a first stage, a second stage, a fourth stage, etc.). In other words, the bleed air can be extracted from any stage of the HPC 214. In some instances, the bleed air extracted from the HPC 214 can have a pressure of between approximately 40 psi and 650 psi and a temperature of between approximately 50° F. and 1400° F. A passageway 254 fluidly couples the bleed port 252 of the HPC 214 to the second mixer inlet 238. To regulate a pressure and/or a flow rate of the bleed air to the second mixer inlet 238, the passageway 254 includes a first control valve 256 (e.g., a pressure regulator, a control valve, etc.). Thus, the first control valve 256 controls the bleed air between the bleed port 252 (e.g., the second air supply source 240) and the second mixer inlet 238. In some examples, the first control valve 256 provides means for regulating a bleed air pressure of the bleed air to the air mixing device 232. The first control valve 256 is configured to regulate the pressure of the bleed air supplied by the bleed port 252 to a pre-set or predetermined pressure value prior to supplying the bleed air to the second mixer inlet 238 and/or can provide air shut-off. In some examples, as shown in FIG. 2, the passageway 254 includes a safety control valve 258 (e.g., a pressure regulator or control valve) to provide redundancy and/or safety should the first control valve 256 fail. The first control valve 256 and/or the safety control valve 258 can be a pressure-reducing valve (PRV), a pressured-reducing shut off valve (PRSOV), a shut off valve (SOV), a high pressure shut off valve (HPSOV) and/or any other flow control device.

To provide compressed air to the first mixer inlet 234, the bleed air system 200 of the illustrated example employs a compressor system 260 (e.g., the first air supply source 236). The compressor system 260 includes a compressor 262 having a compressor inlet 264 and a compressor outlet 266. The compressor 262 receives air (e.g., fan air) from the first air supply source 236 (e.g., the fan inlet duct 208) at the compressor inlet 264 and provides compressed air at the compressor outlet 266. For example, the first air supply source 236 is fan discharge air. For example, the compressor system 260 or the compressor inlet 264 receives fan air (e.g., atmospheric air, non-compressed air) produced by the fan 206 and compresses the fan air to provide the compressed air to the first mixer inlet 234. For example, the compressor inlet 264 receives fan air (e.g., air at atmospheric pressure and/or temperature) and provides compressed air at the compressor outlet 266 having a pressure of between approximately 20 psi and 30 psi and a temperature of between approximately 50° F. and 140° F. Therefore, the example bleed air system 200 of the illustrated example employs the compressor system 260 to provide pressurized air to the air mixing device 232 while reducing the amount of energy that would otherwise be wasted by extracting pressurized bleed air from the LPC 212.

A passageway 270 (e.g., a duct or conduit) fluidly couples the fan air and the compressor inlet 264. To prevent backflow pressure to a fan bypass 204, the passageway 270 employs a control valve 271 (e.g., a check valve, a back-flow preventer, a shut-off valve (SOV), etc.). For example, the control valve 271 prevents backflow into the fan bypass 204 when the compressor 262 generates a back pressure at the compressor inlet 264 that is greater than a pressure of the fan air (e.g., from the fan inlet duct 208).

The compressor 262 compresses the fan air to provide pressurized air at the compressor outlet 266. A passageway 272 (e.g., a duct or conduit) fluidly couples the compressor outlet 266 and the first mixer inlet 234. A second control valve 273 controls (e.g., modulates) a flow rate of the compressed air between the compressor outlet 266 and the first mixer inlet 234. In some examples, the second control valve 273 provides means for regulating a compressed air pressure of the compressed air to the air mixing device 232. For example, the second control valve 273 regulates a pressure of the compressed air that is to flow to the first mixer inlet 234. The second control valve 273 can be a pressure-reducing valve (PRV), a pressured-reducing shut off valve (PRSOV), a shut off valve (SOV), a high pressure shut off valve (HPSOV) and/or any other air control device. In some examples, the compressor system 260 provides means for compressing air received from the fan inlet duct 208.

In the illustrated example, the compressor system 260 is a shaft-driven compressor system driven by the aircraft engine 106. To operate the compressor system 260, a driveshaft 276 couples the aircraft engine 106 (e.g., a gas turbine engine) and the compressor 262, where the aircraft engine 106 drives the compressor 262 via the driveshaft 276. The compressor system 260 includes a transmission 261 (e.g., a continuous variable transmission) installed between the aircraft engine 106 (e.g., the HPC shaft 220) and the compressor 262. In some examples, the transmission 261 provides means for driving the compressor system 260 via the aircraft engine 106.

The transmission 261 enables a speed of the compressor 262 to vary (e.g., increase or decrease) based on an operating speed of the aircraft engine 106. The transmission 261 includes a gearbox 274 operatively coupled to the compressor 262 and a first end of the driveshaft 276 (e.g., a radial driveshaft). The driveshaft 276 rotates to provide power to the gearbox 274 and, thus, to the compressor 262. In the illustrated example, a second end of the driveshaft 276 is operatively coupled to the aircraft engine 106. Specifically, the second end of the driveshaft 276 is coupled to a first gear 278. The first gear 278 is engaged with a second gear 279 that is operatively coupled to the HPC shaft 220 of the HPC 214. In the example shown, the first and second gears 278, 279 are bevel gears and are oriented substantially perpendicular to each other. As the HPC shaft 220 rotates about its longitudinal axis, the second gear 279, which is engaged with the first gear 278, rotates the first gear 278 and, thus, the driveshaft 276 about its longitudinal axis.

In some examples, the gearbox 274 is operatively coupled to one or more other systems used in the aircraft such as, for example, an electrical generator and/or a hydraulic pump. The compressor system 260 and, more generally, the bleed air system 200 of the illustrated example is external relative to the core gas turbine engine 202 of the aircraft engine 106. For example, the compressor 262 and/or the gearbox 274 of the compressor system 260 are disposed within the nacelle of the aircraft engine 106.

Additionally, although the second gear 279 is shown as operatively coupled to the HPC shaft 220 in the illustrated example, in other examples, the second gear 279 can be operatively coupled to and driven by the LPC shaft 218 of the LPC 212 or any other driveshaft of the aircraft engine 106. In the illustrated example, a gear ratio is employed between the HPC shaft 220 and the compressor 262. The first and second gears 278, 279 are sized to enable the compressor 262 to boost a pressure of the fan air received from the fan inlet duct 208 to a pressure demanded by the ECS 224 and the TAI 226. In some examples, the compressor 262 boosts the fan air from the fan inlet duct 208 by a factor of between approximately 1.5 and 3.5. The compressor 262 can be, for example, a centrifugal compressor, an axial compressor or a mixed-flow compressor. In some examples, to account for varying inflow conditions (e.g., pressure fluctuations) and varying outflow demands, the compressor 262 includes variable geometry features such as inlet guide vanes and/or diffuser guide vanes to enable the compressor 262 to handle a range of variability in the inlet conditions and the outlet demands. More particularly, in some examples, the guide vanes can be adjusted to achieve a higher or a lower air flow and/or pressure at the compressor outlet 266. In other examples, a vane-less diffuser or system having a ported shroud can be employed to account for varying inflow conditions and outflow demands.

Unlike known systems, the compressor system 260 extracts fan air (e.g., having a lower pressure and is relatively cooler) instead of bleed air from the LPC 212 and uses the power from the HPC shaft 220 to boost the pressure of the air an appropriate amount for the bleed air system 200. As a result, the compressor system 260 does not utilize a precooler or intercooler to reduce a temperature of the air which wastes energy that was used to produce the relatively higher pressurized bleed air in the LPC 212. However, in some examples, the compressor system 260 employs a precooler to reduce a temperature of the compressed air and/or the bleed air from the HPC 214.

Although the compressor inlet 264 of the illustrated example receives fan discharge air, the compressor inlet 264 can receive bleed air (e.g., boosting) from a dedicated compressor stage of the LPC 212 (e.g., a fourth stage, an eighth stage, etc.). The compressor inlet 264 is fluidly coupled to a bleed port 280 of the LPC 212 via a passageway 281 (e.g., a conduit or a duct). A control valve 282 (e.g., a pressured-reducing shut off valve (PRSOV), a shut off valve (SOV) etc.) controls the flow of bleed air between the LPC 212 and the compressor inlet 264. For example, when a pressure of the compressed air provided by the compressor 262 is not sufficient to meet demands of the ECS 224 and/or the TAI 226, the bleed air system 200 extracts or diverts bleed air from the LPC 212 (e.g., a final stage or discharge of the LPC 212). In some examples, the bleed air system 200 employs bleed air from the LPC 212 to be used in addition to or as an alternative to the compressor system 260 to provide compressed air to the first mixer inlet 234. In some examples, bleed air from the LPC 212 functions as a safety or redundant system. In other words, if the compressor system 260 is inoperable, the bleed air system 200 still functions to provide mixed air to the ECS 224 and the TAI 226 by extracting or diverting bleed air from the LPC 212.

In the illustrated example, a control valve 283 (e.g., a dump valve, a surge control valve, a three-way valve, a three-way pressure regulating valve) is disposed between the compressor outlet 266 and the first mixer inlet 234 (e.g., upstream from the second control valve 273). The control valve 283 operates to prevent the compressor 262 from stalling or surging. In the example shown, a passageway 284 fluidly couples an outlet of the control valve 283 to the fan bypass 204.

During operations (e.g., taxiing, idling, climb and/or descent), the compressor system 260 extracts fan air (e.g., at atmospheric pressure) and uses the power from the HPC shaft 220 to boost the pressure of the fan air to provide an appropriate amount of compressed air to the first mixer inlet 234. A pressure of the compressed air provided by the compressor outlet 266 is sufficient (e.g., is not too low) to meet the demands of the systems (e.g., the TAI 226) when combined with the bleed air of the HPC 214 via the air mixing device 232 to meet the pressure demands of the ECS 224 and the TAI 226. The bleed air is provided to the second mixer inlet 238 from the HPC 214 via the passageway 254. The bleed air has a constant temperature (warmer air) and a quantity (e.g., a volumetric flow rate) of the compressed air (cooler air) can be regulated to either increase or decrease a temperature of the mixed air at the discharge 242.

To provide mixed air at the discharge 242 of the air mixing device 232 having a characteristic (e.g., a calculated heat flux (e.g., mass flow rate times temperature)) sufficient to meet the demands of the TAI 226 and the ECS 224, a bleed air system controller 286 monitors a pressure of the mixed air at the discharge 242. The bleed air system controller 286 includes a heat flux determiner 288, a heat flux/pressure correlator 289, an input/output module 290, a comparator 291, and a valve controller 292. The heat flux determiner 288, the heat flux/pressure correlator 289, the input/output module 290, the comparator 291, and the valve controller 292 are communicatively coupled via a bus 299.

The heat flux determiner 288 calculates or determines a required heat flux of the mixed air at the discharge 242 needed to meet the demands of the ECS 224 and/or the TAI 226 based on flight and/or operating condition(s). For example, the heat flux is provided or defined by a mass flow rate and a temperature of the mixed air exiting the discharge 242. In the illustrated example, the bleed air system controller 286 is communicatively coupled to an engine control system 287, which receives or determines operating parameters and/or flight conditions including, for example, altitude, air speed, throttle lever position, air pressure, air temperature, humidity, engine speed, air density, passenger count, and/or other parameter(s). For example, the heat flux determiner 288 determines a heat flux value based on air temperature conditions and/or altitude conditions. For example, the heat flux determiner 288 determines a first heat flux characteristic for the mixed air at the discharge 242 when air temperature is 5° F. and the aircraft 100 is taxiing that is greater than a second heat flux of the mixed air when air temperature is 50° F. and the aircraft 100 is taxiing.

The heat flux determiner 288 communicates the determined heat flux to the heat flux/pressure correlator 289. The heat flux/pressure correlator 289 determines a reference pressure that is required to provide the mixed air at the discharge 242 with the heat flux characteristic determined by the heat flux determiner 288. For example, the heat flux/pressure correlator 289 obtains the reference pressure from a look-up data or database. In some examples, the heat flux/pressure correlator 289 calculates the reference pressure correlating to the determined heat flux based on pressures, temperatures, densities and/or other air parameter(s) of the compressed air and the bleed air and/or areas of the first mixer inlet 234, the second mixer inlet 238, the passageway 244, and/or the discharge 242.

Thus, the bleed air system controller 286 of the illustrated example varies (e.g., increases or decreases) a heat flux characteristic of the mixed air at the discharge 242 by monitoring a pressure of the mixed air at the discharge 242 relative to a reference pressure (e.g., a predetermined pressure value) that correlates or corresponds to the heat flux characteristic. The pressure of the mixed air at the discharge 242 of the air mixing device 232 is dependent on a pressure of the compressed air from the compressor outlet 266 and a pressure of the bleed air from the HPC 214. Thus, the valve controller 292 controls the first control valve 256 or the second control valve 273 to provide the mixed air with a predetermined heat flux characteristic. In other words, the valve controller 292 and/or the bleed air system controller 286 causes the bleed air system 200 to provide mixed air at the discharge 242 having a pressure based on a mixed air pressure threshold that correlates to the predetermined heat flux characteristic provided by the heat flux determiner 288.

To this end, the valve controller 292 operates the first control valve 256 (e.g., a first pressure regulator) and the second control valve 273 (e.g., a second pressure regulator) based on one or more signals from first, second and third sensors 293, 294, 295 respectively positioned at or upstream from the first mixer inlet 234, the second mixer inlet 238 and the discharge 242 to affect a pressure of the mixed air at the discharge 242. The first, second and third sensors 293, 294, 295 are communicatively coupled to provide output signals to the bleed air system controller 286 via the input/output module 290. For example, the first sensor 293 measures a pressure of the compressed air at the first mixer inlet 234, the second sensor 294 measures a pressure of the bleed air at the second mixer inlet 238 and the third sensor 295 measures a pressure of the mixed air at the discharge 242. Based on the received signals, the bleed air system controller 286 and/or the valve controller 292 regulates a pressure of the compressed air at the first mixer inlet 234 and a pressure of the bleed air at the second mixer inlet 238 to produce the mixed air with a discharge pressure that is within a mixed air pressure threshold.

Additionally, the bleed air system 200 includes fourth, fifth and sixth sensors 296, 297, 298. The fourth sensor 296 measures a compressed air temperature between the compressor outlet 266 and the first mixer inlet 234. The fifth sensor 297 measures a bleed air temperature of the bleed air between the HPC 214 and the second mixer inlet 238. The sixth sensor 298 measures a mixed air temperature of the mixed air exiting the discharge 242 of the air mixing device 232. In some examples, the bleed air system 200 includes other sensors such as, for example, mass flow rate sensors, heat flux sensors and/or any other type of sensors to measure different air parameter(s) of the compressed air (e.g., upstream from the first mixer inlet 234), the bleed air (e.g., upstream from the second mixer inlet 238) and/or the mixed air (e.g., downstream from the discharge 242).

The comparator 291 compares a pressure signal provided by the third sensor 295 representative of a discharge pressure of the mixed air at the discharge 242 with the reference pressure provided by the heat flux/pressure correlator 289 and determines if the comparison (e.g., the difference) is within a mixed air pressure threshold. For example, the comparator 291 determines if the measured pressure of the mixed air at the discharge 242 provided by the signal of the third sensor 295 is within five percent (5%) of the pressure reference provided by the heat flux/pressure correlator 289. In response to determining that the discharge pressure of the mixed air is not within the mixed air pressure threshold of the reference pressure, the bleed air system controller 286 and/or the valve controller 292 adjusts at least one of a pressure of the compressed air flowing to the first mixer inlet 234 via the second control valve 273 or a pressure of the bleed air flowing to the second mixer inlet 238 via the first control valve 256.

In some examples, the bleed air system controller 286 can control one or more parameters such as, for example, a pressure, a temperature, a mass flow rate, a volumetric flow rate, etc., of the mixed air at the discharge 242. For example, the bleed air system controller 286 monitors, regulates and/or controls a temperature of the mixed air at the discharge 242 of the air mixing device 232 based on a temperature threshold corresponding to operating parameters and/or flight conditions.

In some examples, the comparator 291 compares the signals from the first and fourth sensors 293, 296 measuring the compressed air and/or the second and fifth sensors 294, 297 measuring the bleed air to respective pressure and temperature thresholds. For example, if the pressure of the compressed air at the first mixer inlet 234 is greater than a compressed air threshold, the bleed air system controller 286 causes the compressor 262 to operate at a slower speed and/or causes the control valve 283 to open to discharge at least a portion of the compressed air to the fan bypass 204 via the passageway 284. For example, if the pressure of the compressed air at the first mixer inlet 234 is less than a compressed air threshold, the bleed air system controller 286 causes the compressor 262 to operate at a faster speed and/or causes the control valve 282 to open to allow bleed air from the LPC 212 to the compressor inlet 264 to supplement or augment the compressed air to the first mixer inlet 234. In some examples, if a pressure and/or temperature of the bleed air at the second mixer inlet 238 is greater than a bleed air pressure threshold or a bleed air temperature threshold, the valve controller 292 operates the safety control valve 258.

While an example manner of implementing the bleed air system controller 286 is illustrated in FIG. 2, one or more of the elements, processes and/or devices illustrated in FIG. 2 can be combined, divided, re-arranged, omitted, eliminated and/or implemented in any other way. Further, the example heat flux determiner 288, the heat flux/pressure correlator 289, the example input/output module 290, the example comparator 291, the valve controller 292 and/or, more generally, the example bleed air system controller 286 of FIG. 2 may be implemented by hardware, software, firmware and/or any combination of hardware, software and/or firmware. Thus, for example, any of the example heat flux determiner 288, the heat flux/pressure correlator 289, the example input/output module 290, the example comparator 291, the valve controller 292 and/or, more generally, the example bleed air system controller 286 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example heat flux determiner 288, the heat flux/pressure correlator 289, the example input/output module 290, the example comparator 291, the valve controller 292 is/are hereby expressly defined to include a non-transitory computer readable storage device. including the software and/or firmware. Further still, the example bleed air system controller 286 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
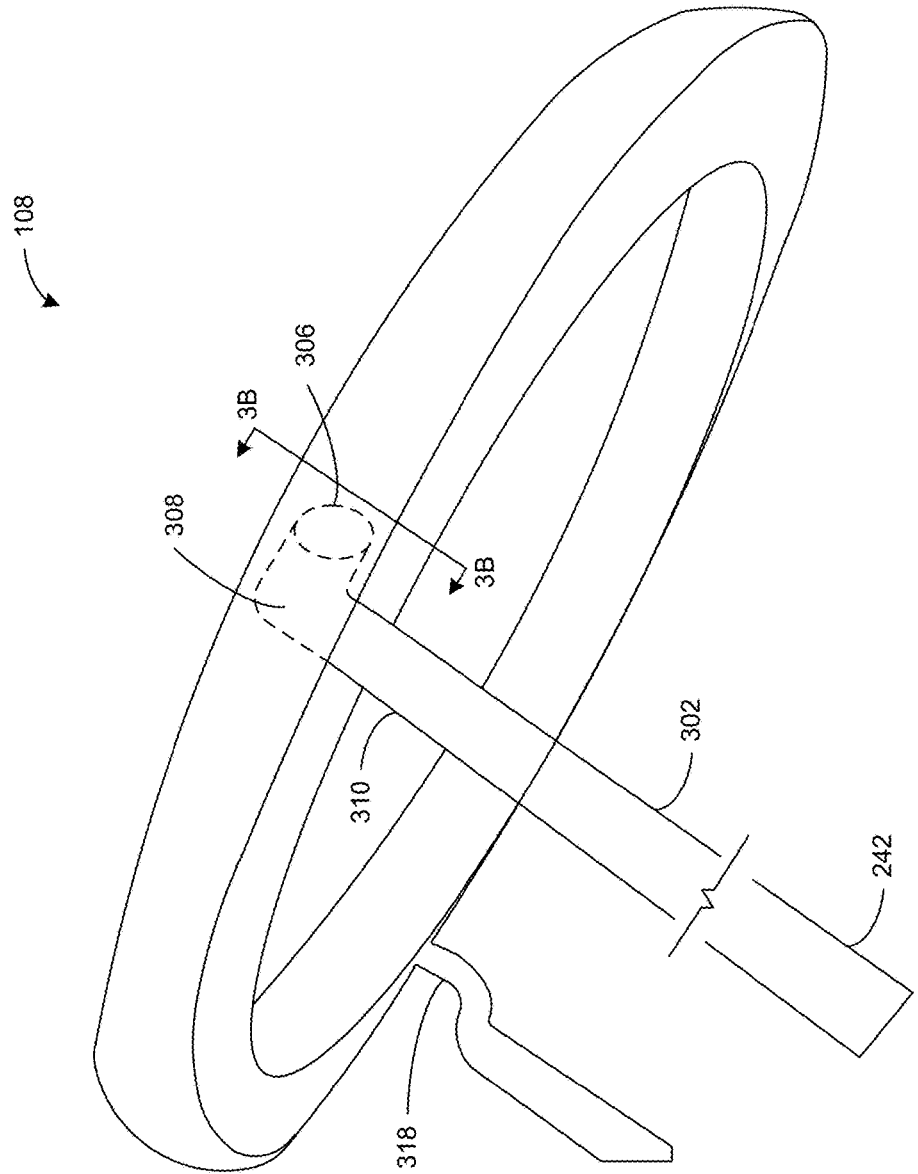
FIG. 3A is a perspective view of an engine inlet of the example aircraft engine of FIGS. 1 and 2.
Figure 3B:
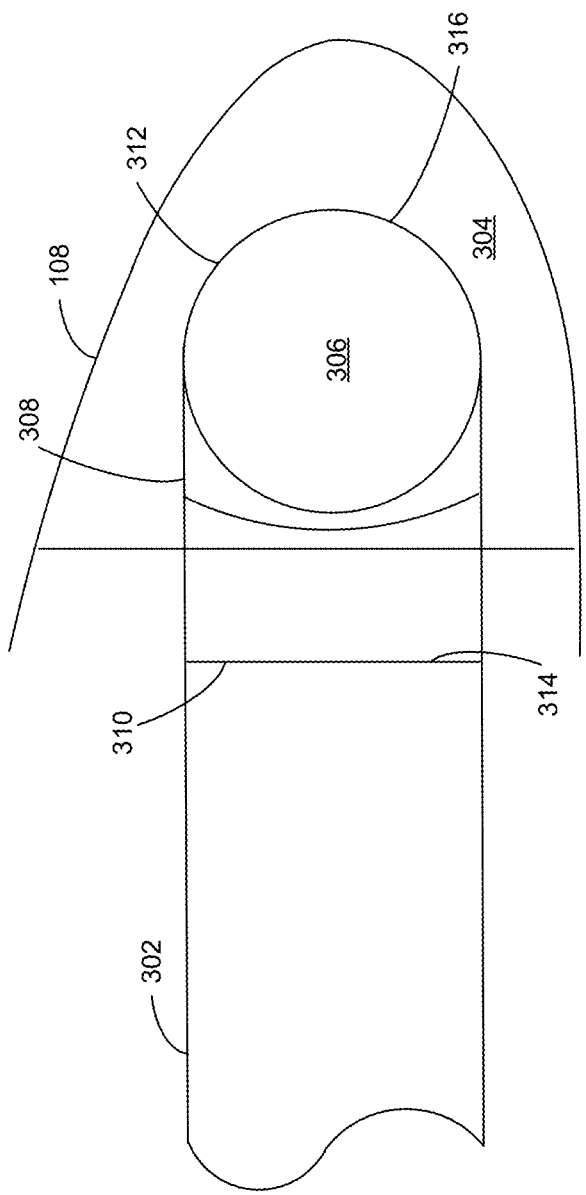
FIG. 3B is a partial, cross-sectional view of the example engine inlet of FIG. 3A taken along line 3B-3B of FIG. 3A.

FIG. 3A is a perspective view of the engine lip 108 of FIG. 1. FIG. 3B is a cross-sectional view of the engine lip 108 taken along line 3B-3B of FIG. 3A. The engine anti-icing system 228 includes a passageway 302 (e.g., a conduit or a duct) to channel the mixed air from the discharge 242 to the engine lip 108. For example, the engine anti-icing system 228 discharges the mixed air in a cavity 304 of the engine lip 108 via an outlet 306. Specifically, the outlet 306 is provided by an elbow 308 (e.g., a ninety-degree elbow) at an end 310 of the passageway 302. An opening 312 of the elbow 308 allows the mixed air (e.g., anti-icing air) to freely flow as the mixed air flows into the cavity 304 of the engine lip 108. For example, a diameter of the elbow 308 is constant between a first end 314 (e.g., defining an elbow inlet) and a second end 316 (e.g., defining an elbow outlet). The mixed air discharged in the cavity 304 swirls around the engine lip 108 to increase a surface temperature of an exterior surface of the engine lip 108 to reduce, prevent and/or eliminate formation of ice during certain conditions. After the mixed air swirls around the cavity 304 of the engine lip 108, the mixed air is dumped overboard via a channel 318 fluidly coupled to the cavity 304. Further, because the mixed air is mixed at the air mixing device 232 upstream from the outlet 306, the mixed air does not generate hot spots at certain areas of the engine lip 108 (e.g., near the outlet 306) and does not cause discoloration or damage. As a result, the engine lip 108 can be formed of a lighter weight, less expensive material such as, for example, aluminum.

Figure 4:
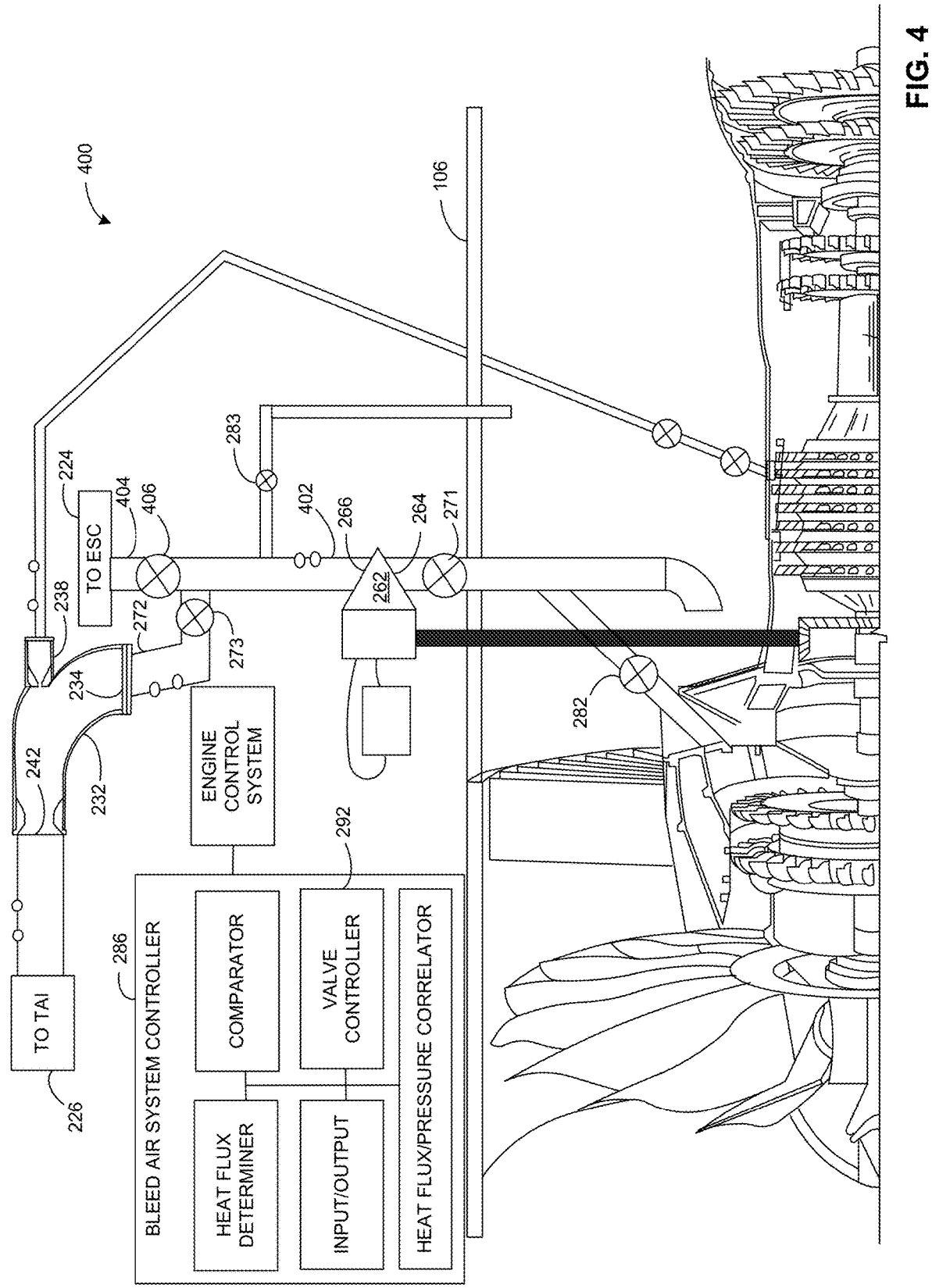
FIG. 4 is a schematic illustration of another example bleed air system disclosed herein that may implement the aircraft of FIG. 1.

FIG. 4 illustrates another example bleed air system 400 that can implement an aircraft engine of an aircraft such as, for example, the aircraft engine 106 and the aircraft 100 of FIG. 1. Many of the components of the example bleed air system 400 of FIG. 4 are substantially similar or identical to the components of the bleed air system 200 described above in connection with FIGS. 1, 2, 3A and 3B. As such, those components will not be described in detail again below. Instead, the interested reader is referred to the above corresponding descriptions for a complete written description of the structure and operation of such components. To facilitate this process, identical reference numbers will be used for structures in FIG. 4 that correspond to structures in FIGS. 1, 2, 3A and 3B.

Referring to FIG. 4, the example bleed air system 400 provides mixed air from the discharge 242 of the air mixing device 232 to the TAI 226 (e.g., in substantially the same manner as the bleed air system 200 of FIG. 2). For example, the air mixing device 232 receives the compressed air from the compressor outlet 266 via the passageway 272 and a passageway 402. The valve controller 292 operates the second control valve 273 of the passageway 272 to vary (e.g., increase or decrease) an air parameter (e.g., a pressure, a temperature, a mass flow rate, etc.) of the compressed air from the compressor outlet 266 prior to the compressed air flowing to the first mixer inlet 234.

The bleed air system 400 does not provide the mixed air from the discharge 242 of the air mixing device 232 to other systems of the aircraft 100 such as, for example, the ECS 224. Unlike the bleed air system 200 of FIG. 2, the bleed air system 400 of the illustrated example provides compressed air from the compressor outlet 266 to the ECS 224 via a passageway 404 (e.g., a conduit or a duct). A control valve 406 is provided in the passageway 404 to vary (e.g., increase or decrease) an air parameter (e.g., a pressure, a temperature, a mass flow rate, etc.) of the compressed air prior to the compressed air flowing to the ECS 224. For example, the valve controller 292 of a bleed air system controller 286 can manipulate one or more control valves 271, 282, 283 and 406 to provide compressed air to the ECS 224 at desired or predetermined characteristic(s). Thus, the bleed air system 400 of FIG. 4 employs the compressor 262 to provide compressed air to the first mixer inlet 234 and the ECS 224. In this manner, the ECS 224 receives compressed air having a pressure and/or temperature that is different than a pressure and/or temperature of the compressed air provided to the first mixer inlet 234. In some examples, the ECS 224 includes other devices (e.g., pressure regulators, coolers, etc.) to adjust or affect air characteristics (e.g., pressure, temperature, mass flow rate, etc.) of the compressed air prior to supplying a cabin of the fuselage 104.

Figure 5:
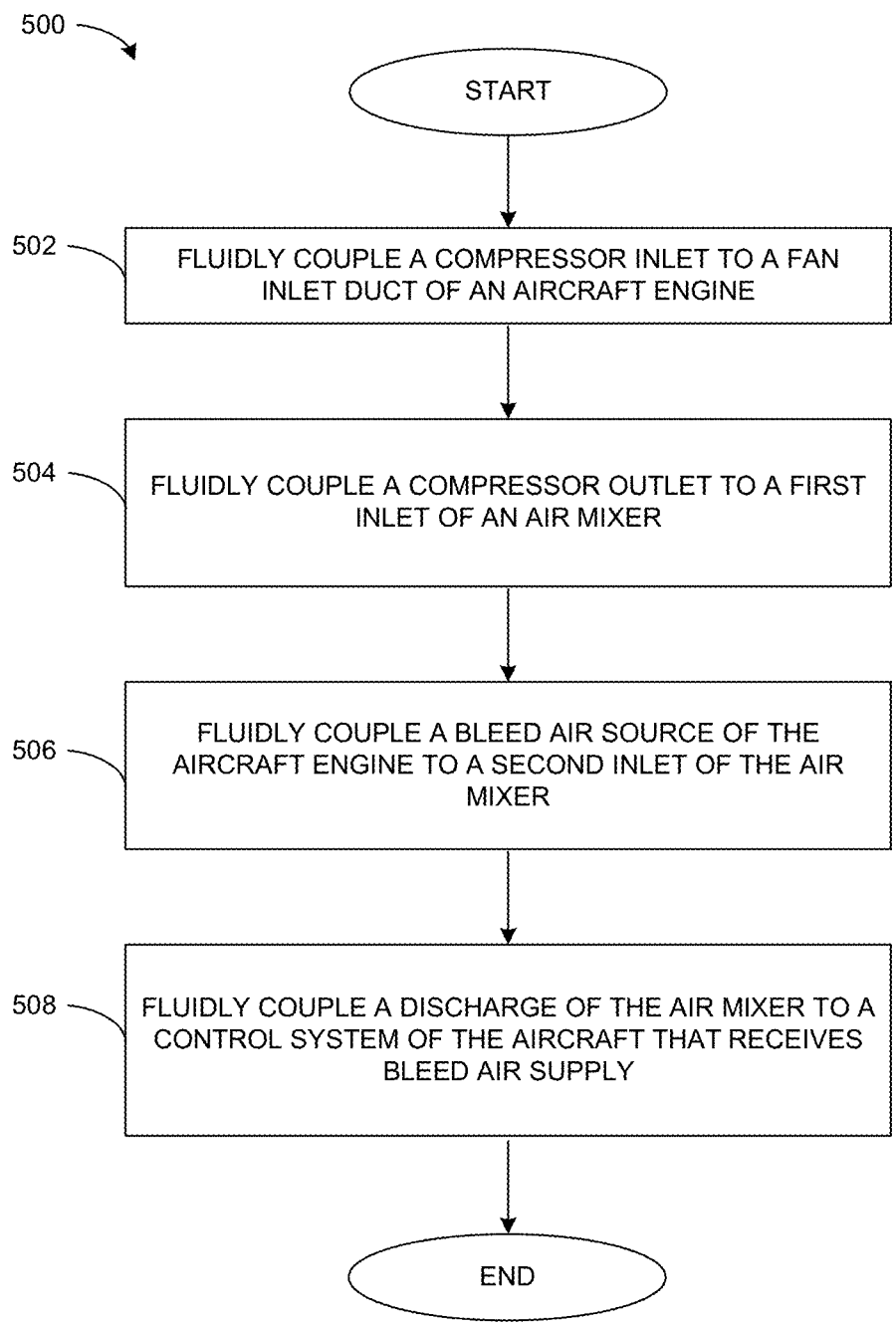
FIG. 5 is a flowchart illustrating a method of implementing the example bleed air systems of FIGS. 2 and 4.

FIG. 5 is a flowchart of an example method 500 of implementing the example bleed air systems 200 and/or 400 in accordance with the teachings of this disclosure. While an example manner of implementing the example bleed air systems 200 and 400 is shown in FIG. 5, one or more of the blocks and/or processes illustrated in FIG. 5 may be combined, divided, re-arranged, omitted, eliminated and/or implemented in any other way. Further still, the example method 500 of FIG. 5 may include one or more processes and/or blocks in addition to, or instead of, those illustrated in FIG. 5, and/or may include more than one of any or all of the illustrated processes and/or blocks. Further, although the example method 500 is described with reference to the flowchart illustrated in FIG. 5, many other methods of implementing a bleed air system may alternatively be used.

Referring to FIG. 5, the compressor inlet 264 of the compressor 262 is fluidly coupled to receive the fan discharge air of the aircraft engine 106 (block 502). For example, the passageway 270 (e.g., conduit) fluidly couples the fan air to the compressor inlet 264.

The compressor outlet 266 is fluidly coupled to the first mixer inlet 234 of the air mixing device 232 (block 504). For example, the passageway 272 (e.g., conduit) fluidly couples the compressor outlet 266 and the first mixer inlet 234 of the air mixing device 232. In some examples, such as that disclosed in the bleed air systems 200 and 400, the compressor inlet 264 is also fluidly coupled to bleed air from the LPC 212 of the aircraft engine 106. Thus, the example compressor inlet 264 of the example bleed air systems 200 and 400 receives fan air (e.g., from the fan inlet duct 208 or intake section) and/or bleed air from the LPC 212. In other examples, the compressor inlet 264 is coupled to more bleed air sources (e.g., the HPC 214).

In the example method 500 of FIG. 5, bleed air from an HPC 214 of the aircraft engine 106 is fluidly coupled to the second mixer inlet 238 of the air mixing device 232 (block 506). For example, the passageway 254 (e.g., conduit) fluidly couples the bleed air from the HPC 214 to the second mixer inlet 238 of the air mixing device 232.

In the example method 500 of FIG. 5, the mixed air from the discharge 242 of the air mixing device 232 is fluidly coupled to a control system of the aircraft 100 that receives the mixed air (block 508). In the example bleed air system 200 disclosed above, the discharge 242 is fluidly coupled, via a passageway (e.g., conduit), to the ECS 224, the engine anti-icing system 228 and the wing anti-icing system 230. In some examples, the mixed air can be fluidly coupled or provided to any other system of the aircraft that utilizes pressurized (e.g., bleed) air. In the example bleed air system 400 disclosed above, the discharge 242 is fluidly coupled, via the passageway 272 (e.g., conduit), to the wing anti-icing system 230 and the engine anti-icing system 228 (e.g., the first mixer inlet 234). However, ECS 224 is fluidly coupled to the compressor outlet 266 via the passageways 402 and 404 (e.g., conduit) and, thus, the ECS 224 is not fluidly coupled to the discharge 242 of the air mixing device 232.

Figure 6:
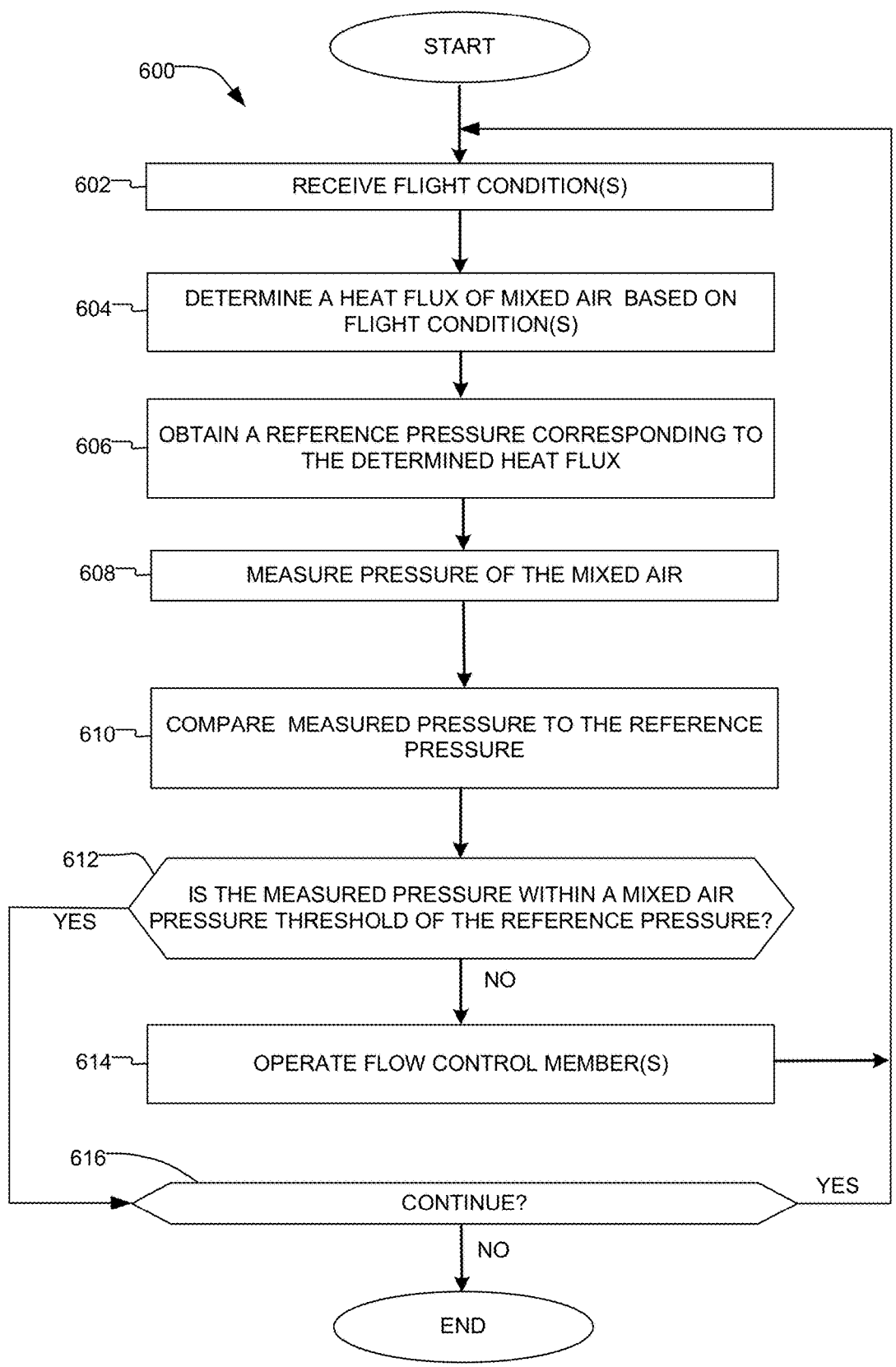
FIG. 6 is a flowchart representative of an example method that may be performed by the example bleed air systems of FIGS. 2 and 4.

FIG. 6 is a flowchart representative of an example method 600 that implements the bleed air system controller 286 of FIGS. 2 and 4. In this example, the method 600 can be implemented using machine readable instructions that comprise a program for execution by a processor such as the processor 700 shown in FIG. 7. The method 600 can be embodied in software stored on a tangible computer readable storage medium such as a CD-ROM, a floppy disk, a hard drive, a digital versatile disk (DVD), a Blu-ray disk, or a memory associated with the processor 700 and/or the bleed air system controller 286, but the entire program and/or parts thereof could alternatively be executed by a device other than the processor 700 and/or the bleed air system controller 286 and/or embodied in firmware or dedicated hardware. Further, although the example program is described with reference to the flowchart illustrated in FIG. 6, many other methods of implementing the example heat flux determiner 288, the example heat flux/pressure correlator 289, the example input/output module 290, the example comparator 291, the example valve controller 292 and/or, more generally, the example the bleed air system controller 286 may alternatively be used. For example, the order of execution of the blocks can be changed, and/or some of the blocks described can be changed, eliminated, or combined.

As mentioned above, the example method of FIG. 6 can be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 6 can be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

For purposes of discussion, the method 600 of FIG. 6 is described in connection with the example the bleed air system controller 286 and the bleed air systems 200, 400. In this manner, each of the example operations of the example method 600 of FIG. 6 is an example manner of implementing a corresponding one or more operations performed by one or more of the blocks of the example bleed air system controller 286 of FIGS. 2 and 4.

Turning in detail to FIG. 6, the bleed air system controller 286 receives flight condition(s) of the aircraft 100 (block 602). For example, the bleed air system controller 286 retrieves, receives and/or otherwise obtains flight conditions from the engine control system 287, which receives multiple input variables of current operating parameters and/or flight conditions including, for example, altitude, air speed, throttle lever position, air pressure, air temperature, humidity, and/or other parameter(s) or condition(s).

The bleed air system controller 286 determines a heat flux of a mixed air based on the flight conditions (block 604). For example, the heat flux determiner 288 determines a heat flux of the mixed air (e.g., anti-icing air) at the discharge 242 that is sufficient for thermal anti-icing based on the flight conditions (e.g., air temperature, altitude, air pressure, engine speed, etc.).

The bleed air system controller 286 obtains or determines a reference pressure corresponding to the heat flux of the mixed air determined by the heat flux determiner 288 (block 606). For example, the heat flux/pressure correlator 289 obtains, receives and/or retrieves from a look-up table a pressure value corresponding to the determined heat flux.

The bleed air system controller 286 measures a pressure of the mixed air at the discharge 242 of the air mixing device 232 (block 608) and compares the measured pressure to the reference pressure (block 610). For example, the bleed air system controller 286 receives a pressure signal from the sensor 295 at the discharge 242 of the air mixing device 232 via the input/output module 290 and the comparator 291 compares the measured pressure to the reference pressure.

The bleed air system controller 286 then determines if the measured pressure is within a mixed air pressure threshold of the reference pressure (block 612). For example, the comparator 291 determines that the measured pressure is within the mixed air pressure threshold if the measured pressure is within, for example, between 1 percent and 10 percent of the reference pressure.

If the measured pressure at the discharge 242 of the air mixing device 232 is not within the mixed air pressure threshold of the reference pressure (block 612), the bleed air system controller 286 operates one or more of the control valves 256, 273, 282, 283 to adjust (e.g., increase or decrease) a pressure of the mixed air at the discharge 242 (block 614). For example, the valve controller 292 receives pressure values from the respective sensors 294, 293 of the compressed air and the bleed air. The valve controller 292 moves the second control valve 273 to adjust a pressure of the compressed air at the first mixer inlet 234 and/or moves the first control valve 256 to adjust a pressure of the bleed air at the second mixer inlet 238. In some instances, if the pressure of the compressed air at the compressor outlet 266 is not sufficient, the bleed air system controller 286 causes the compressor 262 to operate at higher speeds and/or the valve controller 292 operates the control valve 282 to supplement the fan air with the bleed air from the LPC 212 to increase a pressurize of the compressed air.

If the measured pressure at the discharge 242 of the air mixing device 232 is within the mixed air pressure threshold of the reference pressure (block 612), the bleed air system controller 286 determines if the bleed air systems 200, 400 should continue (block 616). For example, the bleed air system controller 286 determines to discontinue monitoring the bleed air systems 200, 400 based on pilot input, aircraft engine being turned off, etc. In some examples, if the flight conditions of the aircraft 100 are within a threshold (e.g., the aircraft 100 is below 30,000 feet relative to sea level and the air temperature is less than 50° F.), the bleed air system controller 286 activates the TAI 226 and/or determines to continue monitoring.

If the bleed air system controller 286 determines that the bleed air systems 200, 400 are to continue (e.g., the bleed air systems 200, 400 should persist), the method 600 returns to block 602. If the bleed air system controller 286 determines if the bleed air systems 200, 400 should not continue (block 616), the method 600 ends. For example, if a flight condition of the aircraft 100 is not within a threshold (e.g., the aircraft 100 is below 30,000 feet relative to sea level and the air temperature is less than 50° F.), the bleed air system controller 286 deactivates the TAI 226. In the bleed air system 400 of FIG. 4, for example, an environmental control system can be employed to monitor a pressure of the compressed air at the ECS 224.

Figure 7:
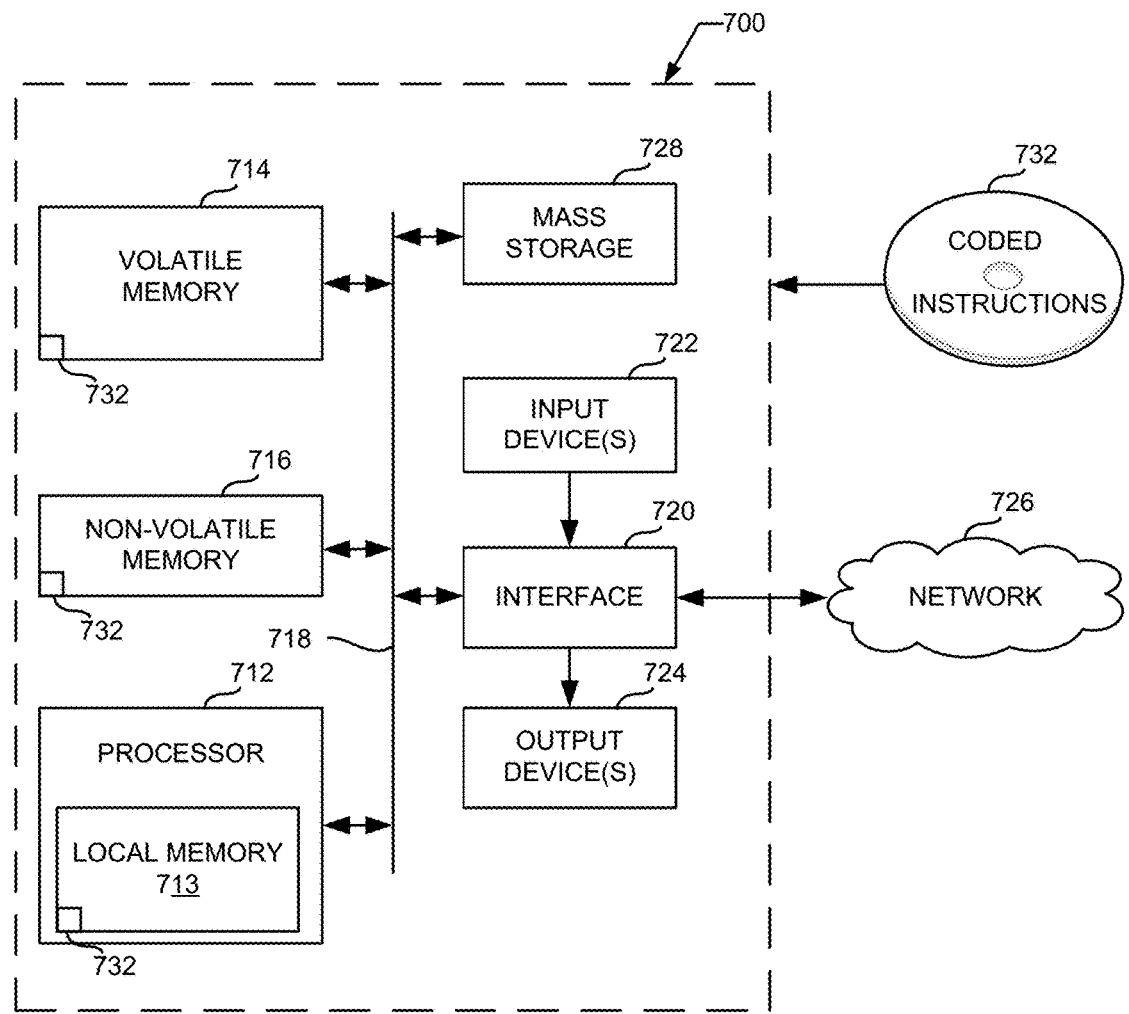
FIG. 7 illustrates an example processor platform structured to execute instructions of FIG. 6 to implement an example bleed air system controller of the example bleed air systems of FIGS. 2 and 4.

FIG. 7 is a block diagram of an example processor platform 700 structured to execute instructions to implement the method of FIG. 6 to implement the bleed air system controller 286 of FIGS. 2 and 4. The processor platform 700 can be, for example, a server, a computer, a workstation, a self-learning machine (e.g., a neural network), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor can be a semiconductor based (e.g., silicon based) device. In this example, the processor implements the example heat flux determiner 288, the heat flux/pressure correlator 289, the example input/output module 290, the example comparator 291, the valve controller 292.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 can be implemented by flash memory and/or any other desired type of memory device. Access to the main memory 714, 716 is controlled by a memory controller.

The processor platform 700 of the illustrated example also includes an interface circuit 720. The interface circuit 720 can be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a satellite system, a line-of-site wireless system, a cellular system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

Machine executable instructions 732 to implement the method 600 of FIG. 6 can be stored in the mass storage device 728, in the volatile memory 714, in the non-volatile memory 716, and/or on a removable non-transitory computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A bleed air system comprising:
   a compressor mounted externally and separate from a core gas turbine engine, the compressor to be driven by the core gas turbine engine via a driveshaft operatively coupling the compressor and the core gas turbine engine, the compressor having a compressor inlet and a compressor outlet, the compressor inlet to receive airflow from a first air supply source; and an air mixing device having a first mixer inlet to receive compressed air from the compressor outlet and a second mixer inlet to receive bleed air directly from a bleed air system, the bleed air to provide a motive fluid to enable the air mixing device to mix the bleed air and the compressed air to produce mixed air for an anti-icing system.

2. The system as defined in claim 1, wherein the compressed air has a first temperature, the bleed air has a second temperature greater than the first temperature, and the mixed air has a third temperature between the first temperature and the second temperature.

3. The system as defined in claim 1, wherein the air mixing device is at least one of a pneumatic jet pump ejector, an eductor or an ejector.

4. The system as defined in claim 1, wherein the second mixer inlet receives the bleed air from a bleed port of a high-pressure compressor of an aircraft engine.

5. The system as defined in claim 1, further including a variable transmission operatively coupled between the gas turbine engine and the compressor.

6. The system as defined in claim 1, wherein the compressor inlet receives fan discharge air.

7. The system as defined in claim 1, further including a first control valve and a second control valve, the first control valve to control flow of the compressed air to the first mixer inlet, the second control valve to control flow of the bleed air to the second mixer inlet.

8. The system as defined in claim 7, wherein the first control valve is to regulate a first pressure of the compressed air to flow to the first mixer inlet and the second control valve is to regulate a second pressure of the bleed air to flow to the second mixer inlet.

9. The system as defined in claim 8, further including a valve controller to control at least one of the first control valve or the second control valve to produce the mixed air with a third pressure based on the first pressure of the compressed air and the second pressure of the bleed air.

10. A bleed air system for an aircraft, the bleed air system comprising:
a compressor mounted external to and separate from a turbofan engine, the compressor to compress airflow received from a fan bypass duct;
an air mixer having a first mixer inlet to receive compressed air from the compressor and a second mixer inlet to receive bleed air from a bleed air port, the air mixer to use the bleed air as motive fluid to mix the compressed air and the bleed air to produce mixed air at a discharge of the air mixer for an anti-icing system; wherein the second mixer inlet receives the bleed air directly from the bleed air port of the aircraft engine, and
a controller to regulate a pressure of the compressed air at the first mixer inlet and a pressure of the bleed air at the second mixer inlet to produce the mixed air with a discharge pressure that is within a mixed air pressure threshold.

11. The system as defined in claim 10, further including a first pressure regulator to regulate the pressure of the compressed air at the first mixer inlet and a second pressure regulator to regulate the pressure of the bleed air at the second mixer inlet.

12. The system as defined in claim 11, wherein the controller is to:
determine a heat flux characteristic based on an air temperature and an altitude of the aircraft;
obtain a reference pressure that correlates with the heat flux characteristic;
measure the discharge pressure of the mixed air at the discharge;
compare the discharged pressure and the reference pressure to determine if the discharge pressure is within the mixed air pressure threshold relative to the reference pressure; and
in response to determining that the discharge pressure is not within the mixed air pressure threshold of the reference pressure, adjust at least one of a first pressure of the compressed air to flow to the first mixer inlet or a second pressure of the bleed air to flow to the second mixer inlet.

13. A method for controlling a bleed air system, the method comprising:
receiving a flight condition;
determining a heat flux of a mixed air to be discharged by an air mixer based on the flight condition;
obtaining a reference pressure corresponding to the heat flux;
providing fan air from a fan bypass to a compressor inlet of an external compressor mounted externally from a core compressor of an aircraft engine, the external compressor to provide compressed fan air at a compressor outlet of the external compressor;
operating at least one of a first control valve a second control valve, the first control valve to regulate a pressure of the compressed fan air to a first mixer inlet of the air mixer, the second control valve to regulate a pressure of bleed air provided directly from the core compressor of the aircraft engine to a second mixer inlet of the air mixer, the bleed air to be received by the second mixer inlet via a duct directly coupled to the second mixer inlet, the compressed fan air and the bleed air, via the air mixer, to produce mixed air having a discharge pressure at a discharge of the air mixer that is within a mixed air pressure threshold of the reference pressure.

14. The method of claim 13, wherein the air mixer is to receive compressed fan air at a first mixer inlet and bleed air at a second mixer inlet, the air mixer to use the bleed air as motive fluid to mix the compressed fan air and the bleed air and produce the mixed air at the discharge of the air mixer.

15. The method as defined in claim 13, further comprising measuring the discharge pressure of the mixed air at the discharge and comparing the discharge pressure of the mixed air at the discharge and the reference pressure.

16. The method as defined in claim 15, further including determining that the measured discharge pressure is not within the mixed air pressure threshold of the reference pressure based on the comparison of the measured discharge pressure and the reference pressure.

17. The method as defined in claim 16, further including adjusting the at least one of the first control valve or the second control valve until the discharge pressure of the mixed air at the discharge is within the mixed air pressure threshold of the reference pressure.

18. The method as defined in claim 13, wherein receiving the flight condition includes receiving an air temperature value or an altitude value from an engine control system of an aircraft.

19. The system as defined in claim 1, wherein the compressor inlet is to receive fan air from a fan bypass.

20. The system as defined in claim 1, further including a duct to channel fan air to the compressor inlet, the duct including a control valve to control a flow of fan air to the compressor inlet.

\* \* \* \* \*